(12) United States Patent
Doyle et al.

(10) Patent No.: US 10,913,253 B2
(45) Date of Patent: Feb. 9, 2021

(54) MANUFACTURING PROCESS FOR ELASTOMERIC LAMINATE (71) Applicant: FIRST QUALITY BABY PRODUCTS, LLC, Great Neck, NY (US)

(72) Inventors: Jeremy A. Doyle, Mount Union, PA (US); Richard Eugene Kelley, Jr., Lock Haven, PA (US); Pierluigi Cappellini, Bellefonte, PA (US)

(73) Assignee: First Quality Baby Products, LLC, Great Neck, NY (US)

( * ) Notice: Subject to any disclaimer, the term of this patent is extended or adjusted under 35 U.S.C. 154(b) by 0 days.

(21) Appl. No.: 16/675,526

(22) Filed: Nov. 6, 2019

(65) Prior Publication Data
US 2020/0070487 A1 Mar. 5, 2020

Related U.S. Application Data (62) Division of application No. 15/135,313, filed on Apr. 21, 2016, now Pat. No. 10,507,633.
(Continued)

(51) Int. Cl.
*B32B 5/00* (2006.01)
*B32B 7/00* (2019.01)
(Continued)

(52) U.S. Cl.
CPC ........ *B32B 37/0053* (2013.01); *B29C 53/265* (2013.01); *B29C 55/023* (2013.01);
(Continued)

(58) Field of Classification Search
CPC .. B32B 5/00; B32B 5/02; B32B 5/022; B32B 5/08; B32B 7/00; B32B 7/10; B32B 7/12;
(Continued)

(56) References Cited

U.S. PATENT DOCUMENTS 6,773,527 B2    8/2004   Campgell et al.
2004/0110442 A1 6/2004   Rhim et al.
(Continued)

OTHER PUBLICATIONS

International Search Report of PCT/US2016/028673 dated Jul. 21, 2016.
(Continued)

*Primary Examiner* — Jacob T Minskey
*Assistant Examiner* — Matthew Hoover
(74) *Attorney, Agent, or Firm* — Amster, Rothstein & Ebenstein LLP (57) ABSTRACT A process for making an elastomeric laminated product including the steps of laminating an elastomeric film between a first spunbond nonvowen layer and a second spunbond nonwoven layer so as to form a laminated web, transporting the laminated web through intermeshing rollers so as to strain portions of the laminated web to form activated regions in the laminated web, and transporting the activated laminated web to a first portion of a rotating wheel, the first portion of the wheel having a cross direction width that is smaller than a cross direction width at a second portion of the wheel, so that the laminated web follows rotation of the wheel and is stretched in the cross direction at the second portion of the wheel before separating from the wheel at the first portion in a relaxed state.

11 Claims, 6 Drawing Sheets

Related U.S. Application Data (60) Provisional application No. 62/150,505, filed on Apr. 21, 2015.

(51) Int. Cl.

| | | |
|---|---|---|
| *B32B 25/00* | (2006.01) | |
| *B32B 37/00* | (2006.01) | |
| *B29C 55/02* | (2006.01) | |
| *B32B 25/10* | (2006.01) | |
| *B29C 55/08* | (2006.01) | |
| *B29C 53/26* | (2006.01) | |
| *B32B 7/12* | (2006.01) | |
| *B32B 5/02* | (2006.01) | |
| *B32B 5/08* | (2006.01) | |
| *B32B 25/14* | (2006.01) | |
| *B32B 7/14* | (2006.01) | |
| *B32B 38/00* | (2006.01) | |
| *B32B 37/06* | (2006.01) | |
| *B32B 37/08* | (2006.01) | |
| *B32B 37/12* | (2006.01) | |
| *B32B 37/20* | (2006.01) | |
| *B29C 53/84* | (2006.01) | |
| *B29L 31/48* | (2006.01) | |

(52) U.S. Cl.
CPC .............. *B29C 55/08* (2013.01); *B32B 5/00* (2013.01); *B32B 5/022* (2013.01); *B32B 5/08* (2013.01); *B32B 7/12* (2013.01); *B32B 7/14* (2013.01); *B32B 25/10* (2013.01); *B32B 25/14* (2013.01); *B29C 53/84* (2013.01); *B29L 2031/4878* (2013.01); *B32B 37/06* (2013.01); *B32B 37/08* (2013.01); *B32B 37/1292* (2013.01); *B32B 37/20* (2013.01); *B32B 38/0012* (2013.01); *B32B 2037/1215* (2013.01); *B32B 2038/0028* (2013.01); *B32B 2250/03* (2013.01); *B32B 2250/40* (2013.01); *B32B 2262/0253* (2013.01); *B32B 2262/12* (2013.01); *B32B 2270/00* (2013.01); *B32B 2305/20* (2013.01); *B32B 2307/718* (2013.01); *B32B 2555/02* (2013.01)

(58) Field of Classification Search
CPC .......... B32B 7/14; B32B 25/00; B32B 25/10; B32B 25/14; B32B 37/00; B32B 37/005; B32B 37/0053; B32B 53/00; B32B 53/20; B32B 53/26; B32B 53/265; B32B 55/00; B32B 55/02; B32B 55/023; B32B 55/08
See application file for complete search history.

(56) References Cited

U.S. PATENT DOCUMENTS

| | | | | |
|---|---|---|---|---|
| 2010/0262103 | A1* | 10/2010 | Turner | B32B 27/32 604/365 |
| 2012/0292819 | A1* | 11/2012 | Rasmussen | B29C 55/18 264/291 |
| 2012/0328845 | A1* | 12/2012 | Middlesworth | B32B 25/10 428/174 |
| 2013/0123734 | A1 | 5/2013 | Desai et al. | |
| 2013/0126070 | A1 | 5/2013 | Siqueira et al. | |
| 2013/0253463 | A1 | 9/2013 | Mansfield | |

OTHER PUBLICATIONS

Written Opinion of International Searching Authority of PCT/US2016/028673 dated Jul. 21, 2016.

* cited by examiner

MANUFACTURING PROCESS FOR ELASTOMERIC LAMINATE

RELATED APPLICATION

This application is a divisional application claiming priority to and the benefit of U.S. application Ser. No. 15/135,313, filed Apr. 21, 2016, entitled MANUFACTURING PROCESS FOR ELASTOMERIC LAMINATE, which in turn is a non-provisional claiming priority to and the benefit of U.S. Provisional Patent Application No. 62/150,505, filed Apr. 21, 2015, entitled MANUFACTURING PROCESS FOR ELASTOMERIC LAMINATE, the contents of which are incorporated herein by reference in their entirety.

BACKGROUND OF THE INVENTION

Manufacture of elastomeric laminates which do not subsequently delaminate is a challenging process. Specific control over product quality attributes is critical. The predominant manufacturing method for making elastomeric laminates is a two-step process where in the first step preparation of a laminated roll is performed, and then in a second step the laminated roll is converted into an activated, cross direction elastic laminate web, wound onto a roll.

Several parameters and tools are used to characterize the properties of the resultant elastomeric laminate, including percentage degradation under a given gram-force value, displacement resulting from a given gram-force value, tensile strength and elongation (load at yield and elongation at yield), tear strength (e.g. the maximum load before tear), and dimensional characteristics such as centerzone thickness.

SUMMARY OF THE INVENTION

The present invention relates to a superior manufacturing process for elastomeric laminates used in articles such as personal absorbent products. In addition, the manufacturing process results in an elastomeric laminate with superior properties.

This invention relates to a manufacturing process for making an elastomeric laminated product comprising:
a) delivering an extruded elastomeric film to a lamination nip;
b) laminating to an upper surface of the extruded elastomeric film, via the lamination nip, a first spunbond nonwoven sheet, and laminating to a lower surface of the extruded elastomeric film, via the lamination nip, a second spunbond nonwoven sheet, wherein the first and second spunbond nonwoven sheets, on the surface of each thereof being laminated to the extruded elastomeric film, each comprise a patterned adhesive that effects adhesion to the extruded elastomeric film when laminated thereto via the lamination nip;
c) moving the laminate resulting from b) through a series of heaters so as to pre-activate the nonwoven sheets;
d) partially activating the laminate via intermeshing rollers so as to effect a laminate comprising a first activated region and a second activated region each separated from their closest respective edge of the laminate by a first and a second non-activated region, respectively, and each separated from each other by a third non-activated region;
e) passing the laminate through a series of contact heaters that apply heat to non-activated regions of the laminate and placing the laminate under tension so as to draw the non-activated regions of the laminate; and
f) feeding the laminate onto a top portion of a rotating wheel such that it is pulled around the wheel via a base portion of the wheel and exits at a top portion of the wheel, wherein the outer edges of the laminate are held in place on the wheel by belts, and wherein the wheel has a wider separation between its outer edges at the base of the wheel as compared to the separation between its outer edges at the top of the wheel, so as to thereby stretch the laminate in a lateral direction and then relax the laminate to its original width before exiting the rotating wheel,
so as to thereby make the elastomeric laminated product.

As used herein, the "top" portion of the wheel and the "base" portion of the wheel are used to describe opposite portions of the wheel (e.g. portions having a center point 180 degrees apart on the wheel) and the use of these terms is not limited to describing portions which are actually physically arranged such that the top portion is above the base portion. As such, for example, the "top portion" where the laminate is fed into and from where it later exits could actually be physically below the base portion when viewed by an observer standing vertically. Also, for example, the "top portion" where the laminate is fed into and from where it later exits can actually be physically above the base portion when viewed by an observer standing vertically.

Also provided is an elastomeric laminated product made by any of the processes described herein.

Also provided is a disposable absorbent article comprising an elastomeric laminated product made by any of the processes described herein.

Also provided is an apparatus for the production of an elastomeric laminate, the apparatus comprising a cross direction pulling station which comprises a rotating wheel on to which a elastomeric laminate is fed, wherein the wheel comprises at least a first and a second rotating disc which rotate about an axis of rotation and wherein a plane of the first rotating disc is at an angle of greater than 0° but less than 45° to the plane of the second disc, such that a perimeter of the first rotating disc and a perimeter of the second rotating disc are closer to one another at one end of the disc rotation than at an opposing end of the disc rotation.

All combinations of the various elements described herein are within the scope of the invention unless otherwise indicated herein or otherwise clearly contradicted by context.

DETAILED DESCRIPTION OF THE INVENTION

Abbreviations

MD—Machine Direction
CD—Cross Direction

A process is provided for making an elastomeric laminated product comprising:
a) delivering an extruded elastomeric film to a lamination nip;
b) laminating to an upper surface of the extruded elastomeric film, via the lamination nip, a first spunbond nonwoven sheet, and laminating to a lower surface of the extruded elastomeric film, via the lamination nip, a second spunbond nonwoven sheet,
wherein the first and second spunbond nonwoven sheets, on the surface of each thereof being laminated to the extruded elastomeric film, each comprise a patterned adhesive that effects adhesion to the extruded elastomeric film when laminated thereto via the lamination nip;
c) moving the laminate resulting from b) through a series of heaters so as to pre-activate the nonwoven sheets;
d) partially activating the laminate via intermeshing rollers so as to effect a laminate comprising a first activated region and a second activated region each separated from their closest respective edge of the laminate by a first and a second non-activated region, respectively, and each separated from each other by a third non-activated region;
e) passing the laminate through a series of contact heaters that apply heat to non-activated regions of the laminate and placing the laminate under tension so as to draw the non-activated regions of the laminate; and
f) feeding the laminate onto a top portion of a rotating wheel such that it is pulled around the wheel via a base portion of the wheel and exits at a top portion of the wheel, wherein the outer edges of the laminate are held in place on the wheel by belts, and wherein the wheel has a wider separation between its outer edges at the base of the wheel as compared to the separation between its outer edges at the top of the wheel, so as to thereby stretch the laminate in a lateral direction and then relax the laminate to its original width before exiting the rotating wheel,
so as to thereby make the elastomeric laminated product.

In an embodiment, the elastomeric film comprises a styrenic block co-polymer. The styrenic block co-polymer of the process can comprise polystyrenic end blocks. The styrenic block co-polymer can comprise hydrogenated mid-blocks of styrene-ethylene/butylene-styrene.

Nonwoven sheets, or webs, may be formed by a variety of processes such as, for example, meltblowing processes, spunbonding processes and bonded carded web processes.

In an embodiment, in step e) of the process the series of contact heaters apply heat only to non-activated regions of the laminate.

The elastomeric film may also comprises a polypropylene, a copolyester, a nylon or a blend of polypropylenes. A non-limiting example of a polymer/elastomeric film that can be used herein is a Kraton G polymer, e.g. Kraton G 1643 MS polymer (Kraton, US). A non-limiting example of a nonwoven spunbond that can be used herein is a bico spunbond. In a non-limiting example, the nonwoven spunbond has a weight of 25 gpsm. In a non-limiting example, a polyolefin spunbond is used comprising bicomponent sheath-core (15-85) having a weight of 10 gpsm and filament count below 1,3 den.

The process optionally further comprises extruding the elastomeric film prior to delivering it to the lamination nip.

In an embodiment, the patterned adhesive is elastomeric. Alternatively, the patterned adhesive is non-elastomeric. The patterned adhesive may be spray applied. Any predetermined pattern can be employed, including wherein the patterned adhesive is applied in lines.

In an embodiment, the patterned adhesive comprises a plurality of parallel strips of adhesive of 0.5 mm to 1.5 mm in width, wherein each of the plurality of parallel strips of elastomeric is separated from at least one other parallel strip of adhesive of the plurality by a parallel strip which is (i) free of adhesive and (ii) of 0.5 mm to 1.5 mm in width. The parallel strips of the adhesive are oriented MD. In another embodiment, the parallel strips of the adhesive are oriented CD. In a further embodiment, the parallel strips of the adhesive are oriented diagonal relative to the motion of the sheets through the laminating nip. In an embodiment, there are 4-6 parallel strips of the adhesive per centimeter width. In an embodiment, there are 5 parallel strips of the adhesive per centimeter width.

Each of the plurality of parallel strips of adhesive can be of equal width. Each of the plurality of parallel strips free of adhesive can be of equal width. In an embodiment, each of the plurality of parallel strips free of adhesive and each of plurality of parallel strips free of adhesive are of equal width.

The adhesive can be elastomeric or, separately, can be non-elastomeric.

The first and/or second spunbond nonwoven sheet can each independently, or both, be polyolefin spunbond bicomponent sheet(s).

In an embodiment, a first roller of the intermeshing rollers in d) includes a series of protruding rings along the majority of the width of the roller, wherein the protruding rings are longitudinal with regard to the direction of motion of the sheets out of the laminating nip, and wherein the long axis of the roller is oriented in a cross direction (CD).

In an embodiment, an opposing roller intermeshing with the first roller, having a long axis oriented in a cross direction (CD) has a surface pattern in cross direction, comprising the following: a flat first edge portion, a series of protruding rings with spaces between each ring, a flat central portion, a second series of protruding rings with spaces between each ring, and a flat second edge portion, wherein the protruding rings of the opposing roller intermesh without touching the protruding rings of the at least one roller, wherein the long axis of the opposing roller is oriented CD and wherein the axis of rotation of the opposing roller is machine direction (MD) with regard to the direction of motion of the sheets out of the laminating nip.

In an embodiment, each series of protruding rings of the at least one roller and the opposing roller have sharp edges for activation, and not rounded or blunt edges.

The process can optionally further comprise trimming edges of the laminate product and winding the laminate product onto a roll.

Also provided is an elastomeric laminated product made by any of the processes described herein. In an embodiment, the laminate is elastic in one direction.

Also provided is a disposable absorbent article comprising an elastomeric laminated product made by any of the processes described herein. In an embodiment, the disposable absorbent article is a diaper.

Also provided is an apparatus for the production of an elastomeric laminate, the apparatus comprising a cross direction pulling station which comprises a rotating wheel on to which a elastomeric laminate is fed, wherein the wheel comprises at least a first and a second rotating disc which rotate about an axis of rotation and wherein a plane of the first rotating disc is at an angle of greater than 0° but less than 45° to the plane of the second disc, such that a perimeter of the first rotating disc and a perimeter of the second rotating disc are closer to one another at one end of the disc rotation than at an opposing end of the disc rotation.

In an embodiment, the laminate is fed onto the rotating wheel at a portion of the wheel where the first second rotating disc are closer to one another than at an opposing end of the wheel, and wherein one edge portion of the laminate is held onto the perimeter of the first rotating disc and wherein an opposite edge portion of the laminate is simultaneously held onto the perimeter of the second rotating disc.

In an embodiment, the rotating wheel is rotated such that the laminate is laterally stretched by passing around a portion of the wheel where the first second rotating disc are further apart from one another than at the portion of the wheel where the laminate is fed onto the rotating wheel, so as to laterally stretch the laminate.

The laminate can exit off the rotating wheel at a portion of the wheel where the first second rotating disc are closer to one another than at an opposing end of the wheel, so as to relax the laminate back to an original size prior to exiting off the rotating wheel.

The laminate may comprise a first nonwoven sheet attached via an adhesive to one side of an elastomeric polymeric film, which elastomeric polymeric film is attached on a second side thereof by an adhesive to a second nonwoven sheet.

An edge of the laminate can be held onto the perimeter of the first rotating disc, and an opposite edge portion of the laminate can be simultaneously held onto the perimeter of the second rotating disc by one or more elastic belt(s) applied under tension to the edge and the opposite edge.

In an embodiment, the axis of rotation of the rotating wheel is parallel to the cross direction of the laminate being fed on to the rotating wheel.

The first and second rotating discs can comprise a metal. In an embodiment, the first and second rotating discs are circular. The $1^{st}$ and $2^{nd}$ disc planes can each have the same angle from the vertical plane, but in different lateral directions.

In an embodiment, the apparatus comprises intermeshing rollers that preactivate the laminate, which intermeshing rollers are positioned in the machine path prior to the cross-direction pulling station. A first roller of the intermeshing rollers can comprise a series of protruding rings along the majority of the width of the roller, wherein the protruding rings are longitudinal with regard to the direction of motion of the sheets out of the laminating nip, and wherein the long axis of the roller is oriented in a cross direction (CD). An opposing roller intermeshing with the first roller, having a long axis oriented in a cross direction (CD), can have a surface pattern in cross direction, comprising the following: a flat first edge portion, a series of protruding rings with spaces between each ring, a flat central portion, a second series of protruding rings with spaces between each ring, and a flat second edge portion, wherein the protruding rings of the opposing roller intermesh without touching the protruding rings of the at least one roller, wherein the long axis of the opposing roller is oriented CD and wherein the axis of rotation of the opposing roller is machine direction (MD) with regard to the direction of motion of the sheets out of the laminating nip.

In the process or apparatus, each series of protruding rings of the at least one roller and the opposing roller can have sharp edges for activation. In an embodiment, they do not have rounded or blunt edges.

In the process or of the apparatus, the protruding rings of the intermeshing rollers can have a sharp-edged profile. (For example, see "tooth" profile in FIG. 4). In an embodiment, each set of rings on a roller has 6 rings or less per inch across the roller. In an embodiment, each set of rings on a roller has no more than 6 rings per inch across the roller. In an embodiment, each set of rings on a roller has 5 rings or less per inch across the roller. In an embodiment, each set of rings on a roller has no more than 5 rings per inch across the roller. In an embodiment, each set of rings on a roller has 6 rings per inch across the roller. In an embodiment, each set of rings on a roller has 5 rings per inch across the roller. In an embodiment, the protruding rings of the intermeshing rollers do not have a round-edged profile.

Elastomeric laminates have an elastic property. An elastic property is a characteristic of a material where, upon application of a biasing force, the material is stretchable, that is, elongatable, to a stretched, biased length which is at least about 150 percent of its relaxed unbiased length, and which will recover at least 50 percent of its elongation upon release of the stretching, elongating force in less than one minute. A nonwoven sheet has a structure of individual fibers or threads which are interlaid, but not in an identifiable, repeating manner.

The process as described herein results in an elastomeric laminate with improved elastic properties. Such characteristics are desirable for use, for example, in production of diaper wings.

As used herein, the terms upper surface and lower surface are relative terms to describe opposite surfaces of a sheet. While the physical orientation of the sheet may be such that the upper surface is in an actual upper position relative to the lower surface, the upper and lower surface terms still apply if the sheet was turned, for example, on its edge such that an observer looking at the sheet would see a left and right surface rather than an actual upper and lower surface.

Figure 1:
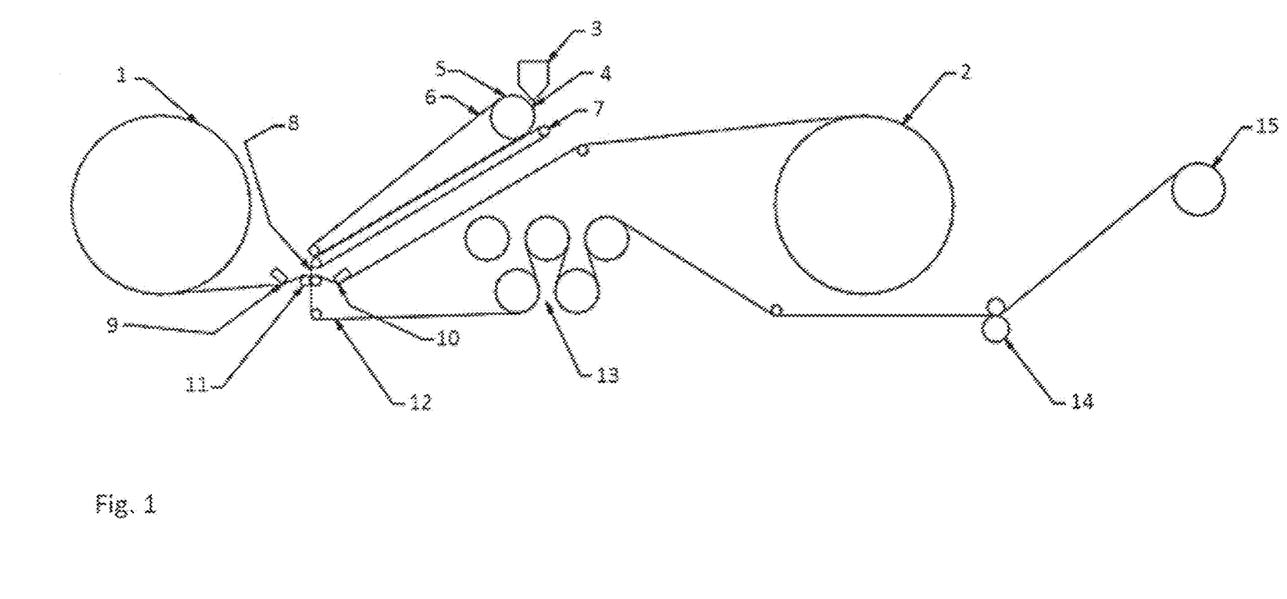
FIG. 1: A schematic of an embodiment of first step of a process for making a laminated web which is wound onto a core for later use/activation.

In an embodiment of a laminate production process and apparatus therefor as shown in FIG. 1, two nonwoven facings 1 and 2 are unwound and a hot melt adhesive, 9 and 10, respectively, is applied in a pattern to each on a side thereof that is brought into contact with an extruded elastomeric film 4. The extruded film results from a polymeric composition, for example a styrenic block co-polymer, held in a die 3 and extruded therefrom onto a conveyer belt 6 and chilled by a chilled roll 5. The chilled extruded film 8 is then transported between conveyer belts 6 and 7 to a nip unit 11 where the two nonwoven facings having hot melt adhesive patterned thereon are applied, adhesive side facing the extruded film, one to either side of the chilled extruded film so as to produce a laminated web 12. The laminated web 12 is transported through a plurality of chilled rolls 13 and fed via a drive nip station 14 to be wound onto a roll at re-winder station 15.

Figure 2:
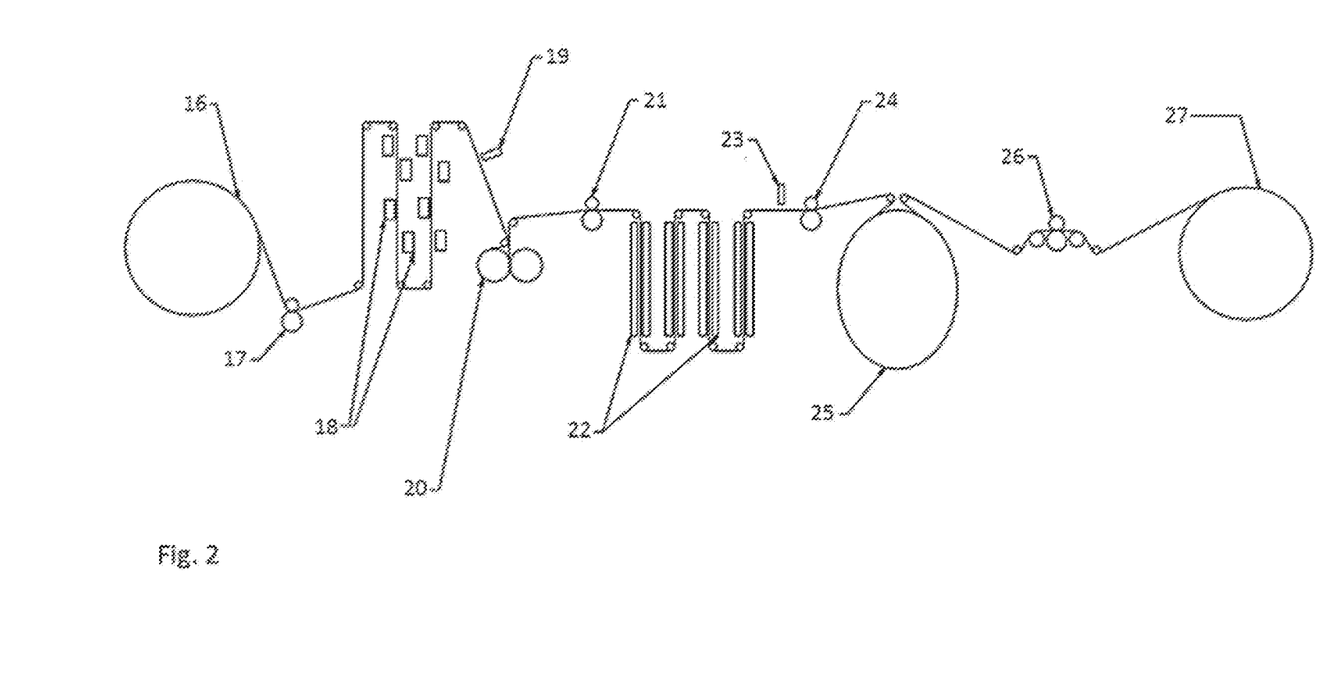
FIG. 2: A schematic of an embodiment of a second step of a process for making an improved elastomeric laminate, including a cross direction pulling station.

In an embodiment of (i) a laminate production process in which the laminate becomes partially activated, and (ii) an apparatus therefor as shown in FIG. 2, laminated web from a roll of laminated web at an un-winder station 16 is fed to a drive nip station 17 and through a web heating station 18 to activation unit 20. The activation unit 20 functions to strain and at least partially deform portions of the nonwoven components of the laminate so that, during use, the nonwoven components can elongate with the elastomeric component of the laminate. In one embodiment, the laminated web may be unrolled from the un-winder station after a predetermined resting period subsequent to its production as set forth in the preceding paragraph. An exemplary activation unit is more fully described in FIG. 4. The temperature of the laminated web is determined subsequent to exit from the web heating station 18 by pyrometer 19, and, optionally, adjustments are made to the heating station to achieve a desired temperature. The partially activated laminated web exiting activation unit 20 is fed by drive nip station 21 into a machine direction web conditioning heating zone 22 (in a non-limiting example, 3 strips) and the temperature of the laminated web exiting 22 is determined by pyrometer 23, and, optionally, adjustments are made to the machine direction web conditioning heating zone to achieve a desired temperature. A drive nip station 24 feeds the laminated web into a cross-direction pulling station 25 where the laminated web is stretched in the cross direction and relaxed back to original entry size before exiting the cross-direction pulling station 25. See FIGS. 5 and 6 for examples of a cross-direction pulling station. The resulting laminated web is fed onto a roll at re-winder station 27 after, optionally, passing through a drive station or a slides slitting station 26.

Figure 3:
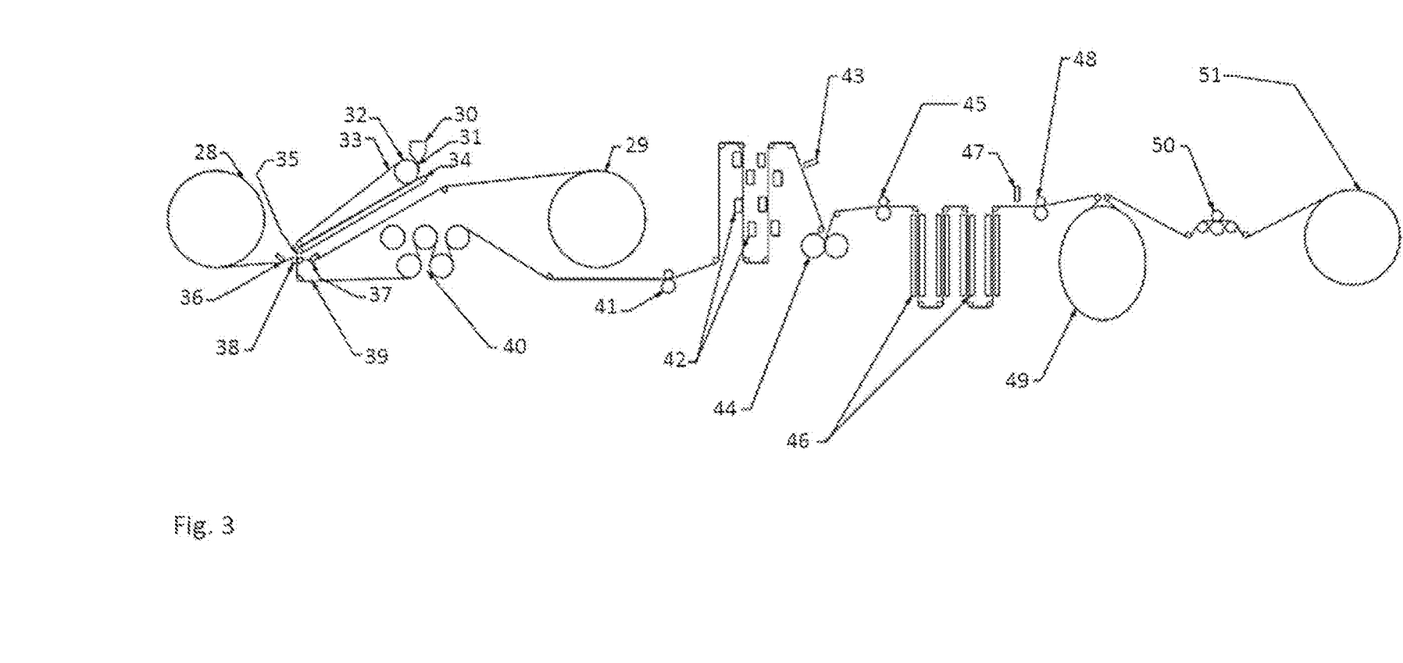
FIG. 3: A schematic of an embodiment of a single process for making an improved elastomeric laminate, including a cross direction pulling station.

In an embodiment of single process laminate production process (and apparatus therefor as shown in FIG. 3), two nonwoven facings 28 and 29 are unwound and a hot melt adhesive, 36 and 37, respectively, is applied in a pattern to each on a side thereof that is brought into contact with an extruded elastomeric film 31. The extruded film results from a polymeric composition, for example a styrenic block co-polymer, held in a die 30 and extruded therefrom onto a conveyer belt 33 and chilled by a chilled roll 32. The chilled extruded film 31 is then transported between conveyer belts 33 and 34 to a nip unit 38 where the two nonwoven facings having hot melt adhesive patterned thereon are applied, adhesive side facing the extruded film, one to either side of the chilled extruded film so as to produce a laminated web 39. The laminated web 39 is transported through a plurality of chilled rolls 40 and fed via a drive nip station 41 through a web heating station 42 to activation unit 44. An exemplary activation unit is more fully described in FIG. 4. The temperature of the laminated web is determined subsequent to exit from the web heating station 42 by pyrometer 43, and, optionally, adjustments are made to the heating station to achieve a desired temperature. The partially activated laminated web exiting activation unit 44 is fed by drive nip station 45 into a machine direction web conditioning heating zone 46 (for example, 3 strips) and the temperature of the laminated web exiting 46 is determined by pyrometer 47, and, optionally, adjustments are made to the machine direction web conditioning heating zone to achieve a desired temperature. A drive nip station 48 feeds the laminated web into a cross-direction pulling station 49 where the laminated web is stretched in the cross direction and relaxed back to original entry size before exiting the cross-direction pulling station 49. See FIGS. 5 and 6 for examples of a cross-direction pulling station. The resulting laminated web is fed onto a roll at re-winder station 51 after, optionally, passing through a drive station or a slides slitting station 50.

Figure 4A:
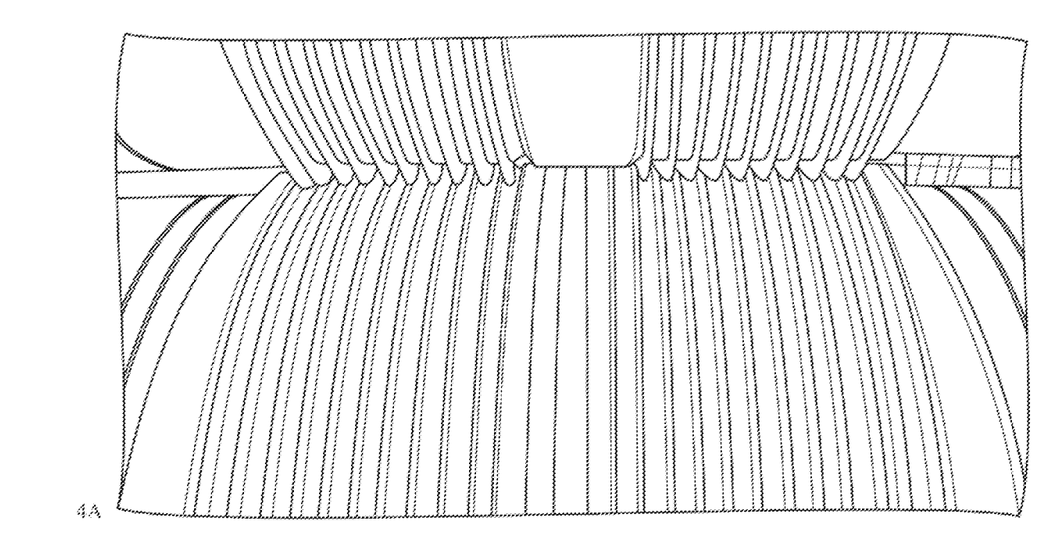
FIG. 4A-4B: 4A: An example of an activation unit that can be used in a process described herein. The roller has, across its length, a flat first edge, a first set of protruding sharp-edged rings, a flat center portion, a second set of protruding sharp-edged rings and a flat second edge. 4B: Schematic of sharp-edged protruding rings of a roller of the activation unit as they intermesh with of sharp-edged protruding rings of an opposing roller of the activation unit. While the rings sets do intermesh, the extent of overlap/intermeshing shown is not limiting and is shown only for illustrative purposes. In an embodiment, the opposing roller has protruding rings across the majority of its width. In an embodiment, the opposing roller has protruding rings across all its width.
Figure 4B:
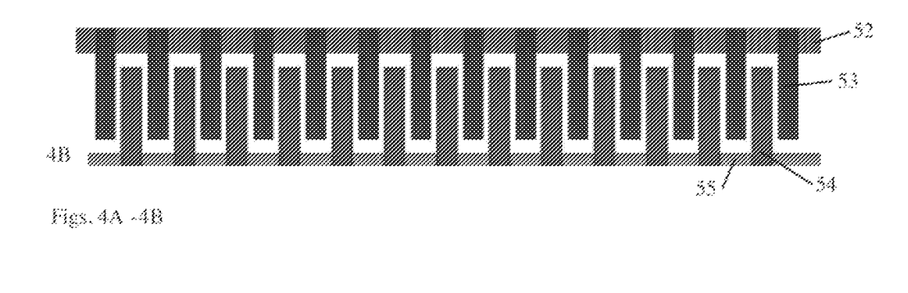

An example of an activation unit that can be used in a process described herein is set forth in FIG. 4A-B. The roller has, across its length, a flat first edge, a first set of protruding sharp-edged rings, a flat center portion, a second set of protruding sharp-edged rings and a flat second edge (for example, see FIG. 4A). A schematic in FIG. 4B shows sharp-edged protruding rings 53 of a roller 52 of the activation unit as they intermesh with of sharp-edged protruding rings 54 of an opposing roller 55 of the activation unit. This arrangement gives results in preferred properties compared to round-edged or blunt-edged intermeshing rings. While the rings sets do intermesh, the extent of overlap/intermeshing shown in FIG. 4B is not limiting and is shown only for illustrative purposes.

Figures 5A, 5B, 5C:
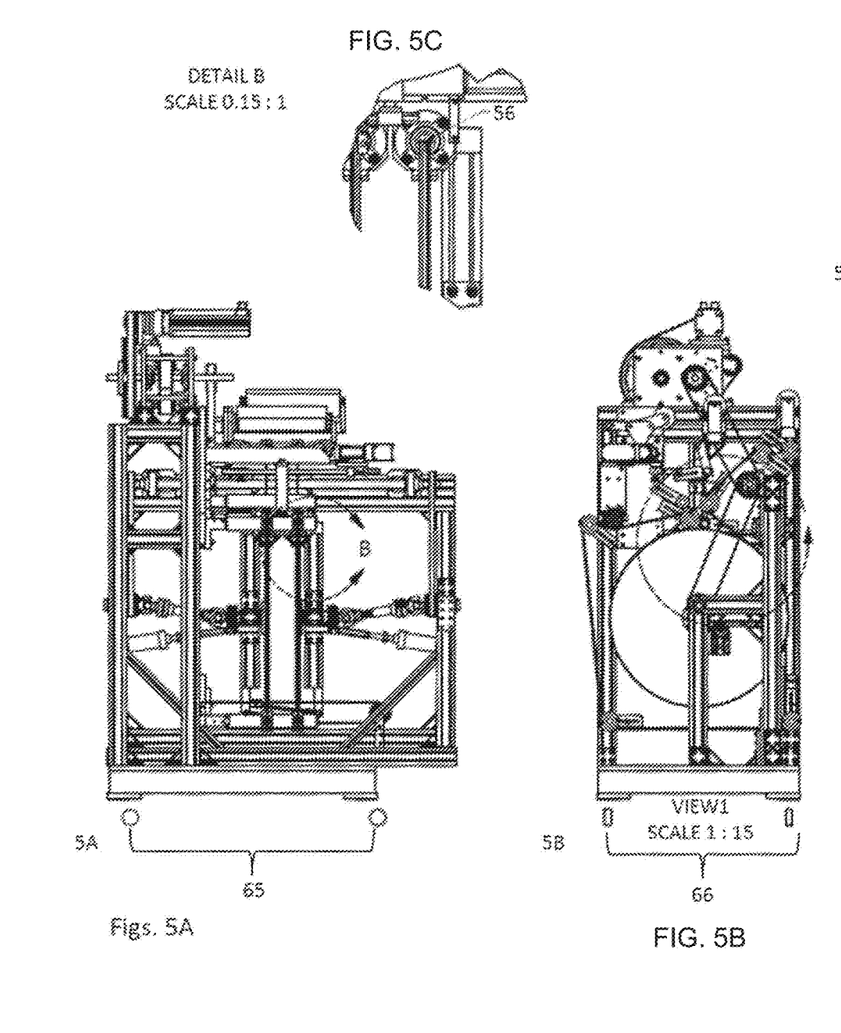
FIG. 5A-5D: An example of a cross direction pulling station that can be used in the process to make an improved elastomeric laminate (non-angled). 5A shows the axis around which one disc of the wheel can be angled. 5B shows the entry and exit of the laminate in regard to the top portion of the rotatable wheel.
Figure 5D:
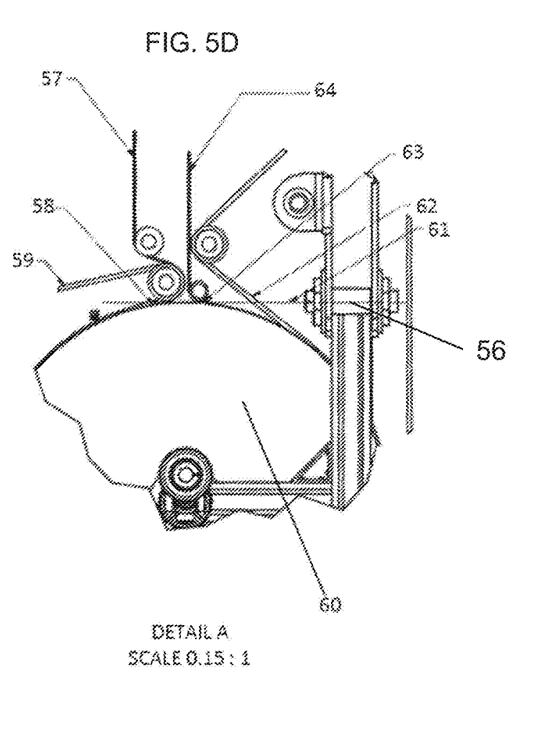
Figures 6A, 6C:
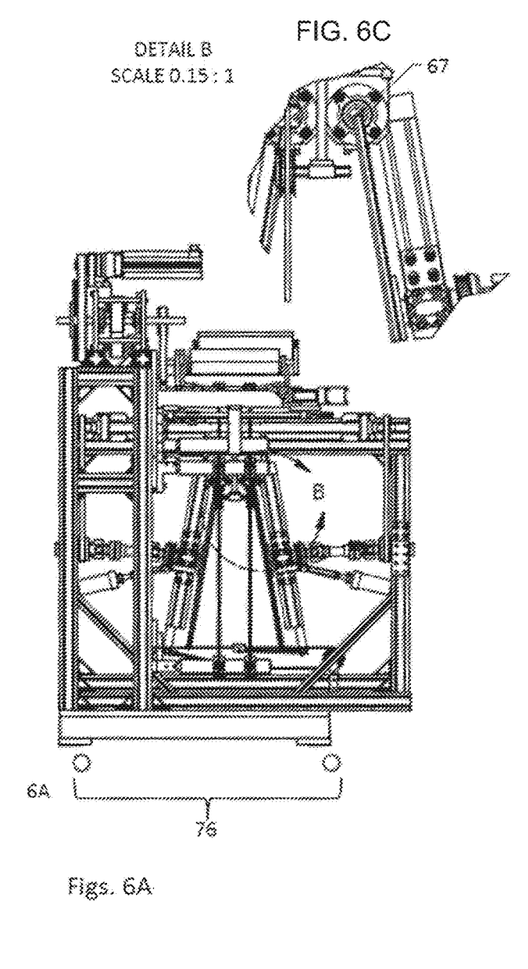
FIG. 6A-6D: An example of a cross direction pulling station that can be used in the process to make an improved elastomeric laminate showing the angling of the wheels that can be used to effect stretching. 6A shows the axis around which one disc of the wheel is angled. 6B shows the entry and exit of the laminate in regard to the top portion of the rotatable wheel. Angle shown is for illustrative purposes and does not limit the actual angles that can be used in the process.
Figure 6B:
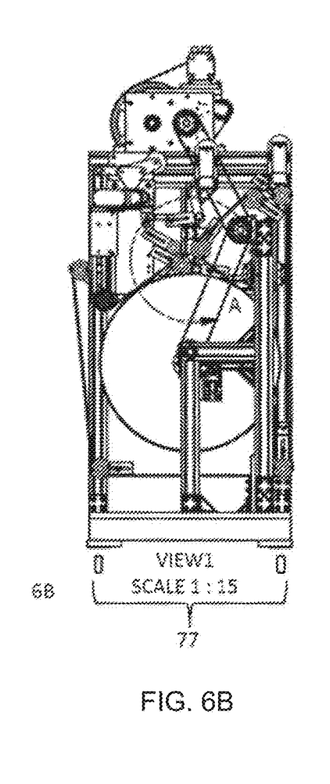

FIGS. 5A-5D and 6A-6D show examples of a cross-direction pulling station, generally designated by reference number 65, according to an exemplary embodiment of the present invention. The cross-direction pulling station 65 can comprise a rotating wheel on to which a laminate is fed, wherein the wheel comprises at least a first and a second rotating disc which rotate about an axis of rotation and wherein a plane of the first rotating disc is at an angle of greater than 0° but less than 45° to the plane of the second disc, such that a perimeter of the first rotating disc and a perimeter of the second rotating disc are closer to one another at one end of the disc rotation than at an opposing end of the disc rotation. The discs can be angled to different degrees relative to one another depending on the amount of cross-direction stretching required for the web. In FIGS. 5A-5D, for the purposes of illustration, the discs are shown not angled but parallel to one another. In FIGS. 6A-6D, the discs are shown angled to one another. The angle may be adjusted as desired by rotating the discs about respective axes of rotation 56, 67 (FIGS. 5C and 6C). As shown in FIG. 5D, the axes of rotation 56 of the rotating discs (or stretching wheel) and the points 58, 63 along the rotating discs at which the entering laminate web 57 first contacts the discs and the exiting laminate web 64 first separates from the discs lay along a straight line 61. The web's width when exiting is the same as entering. The entering laminated web 57 is held on to the stretching wheel (one shown, 60) at point 58 by belting under tension (such as elastic round belting 59). The exiting laminated web 64 after having completed a partial revolution of the stretching wheel is shown, with the belting 62 (which is continuous with belting 59) releasing the exiting laminated web 64 as it comes around towards the exit point 63. FIG. 5A shows an end on view of an exemplary cross-direction pulling station 65, and FIG. 5B shows a side view (MD running in the right to left direction).

Figure 6D:
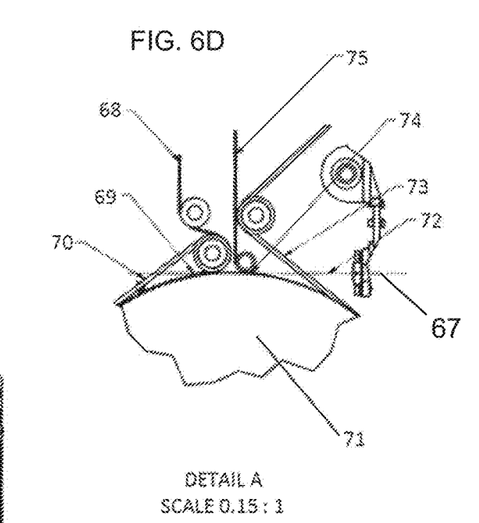

As shown in FIG. 6D, the axes of rotation 67 of the rotating discs (or stretching wheel) and the points 69, 74 along the rotating discs at which the entering laminate web 68 first contacts the discs and the exiting laminate web 75 first separates from the discs lay along a straight line 72. The web's width when exiting is the same as entering. The entering laminated web 68 is held on to the stretching wheel (one shown, 71) at point 69 by belting under tension (such as elastic round belting 70). The exiting laminated web 75 after having completed a partial revolution of the stretching wheel is shown, with the belting 73 (which is continuous with belting 70) releasing the exiting laminated web 75 as it comes around towards the exit point 74. An end on view of an exemplary cross-direction pulling station with the stretching wheel with the angled discs is shown as 76, and a side view (MD running in the right to left direction) shown as 77.

One skilled in the art will readily appreciate that the specific methods and results discussed are merely illustrative of the invention as described more fully in the claims that follow thereafter.

EXAMPLES

Example 1

In a two-step manufacturing process for an elastomeric laminate, the following process was used. Two nonwoven rolls (NW BiCo material) were unwound and one fed to each side of an extruded melted polymer (Kraton G1643MS, from Kraton Polymers US, Houston, Tex.). The extruded melted polymer has been fed as a film from a die and deposited onto a conveyor belt. The drive roll was chilled and the polymer film was conveyed by two transfer belts. At a combining/nip area, each of the two nonwoven facings were fed into contact with coating applicator. The coating applicator was a hot melt slot coating applicator. Above the nip, the elastic film was fed by the conveyor belts. The hot melt adhesive was applied to the two nonwovens prior to lamination. Exemplary patterns include lines across the width, 0.85 mm wide, 2 mm center distance. The laminated web resulting from this was fed through rollers that were chilled as necessary. The laminated web was optionally slit at this point, but was then passed through a drive nip station and wound onto a core for later use (the second step). Activation can be effected just prior to use. See FIG. 1.

Using a pre-laminated roll. When unwound from a pre-laminated roll, for example as made by the process in the preceding paragraph, the laminate can be activated and stretched to become elastomeric by a process as exemplified in FIG. 2. The previously prepared roll of laminated web is un-wound and fed into a drive nip station. The web is fed into a web heating unit prior to entering the activation unit. Machine direction (MD) web-conditioning zoned heating is performed of "dead zones" (non-activated areas). The web is put into contact with heated metal units (3, for example), to transfer heat on the outer edges and middle portion only. Alternatively, multiple passes of the web through non-contact infrared devices can achieve the same activation. One or more pyrometers are employed to detect the web's temperature where heating has been applied. A small amount of MD draw is applied to elongate the dead zones (3 in this example) to match the activated areas (2 in this example). This is not limiting however. On other products, for example, there can be one activated area, and two heating zones, along the edges. Combinations of activated areas and non-activated areas can be set. In a preferred process, all of or a majority of the MD areas/strips, are the same length. The web is then sent to a cross direction pulling station. The web is trapped, for example by rubber or elastic ropes to the wheel of the cross direction pulling station, and the wheel is, or has been, angled to a desired angle. The bottom of the cycle around the wheel is wider than the entry and exit points of the laminated web onto the wheel, resulting in a CD stretching of the laminated web and then a relaxation back to original width before exit from the cross direction pulling station.

In an embodiment, the drive nip stations before and after the machine direction web conditioning, are steel on steel. There can be some MD draw. The pressure and forces compact the fibers of the nonwovens that were previously broken by the activation rings. By "untangling" the activated nonwoven material, (i) a softer material is achieved in the activated area(s), and (ii) a discreet sounding web is effected when pulled CD. Moreover, the elastic properties of the film are improved.

Example 2

The single-step process is exemplified in FIG. 3. Two nonwoven facings 28 and 29 are unwound and a hot melt adhesive, 36 and 37, respectively, is applied in a pattern to each on a side thereof that is brought into contact with an extruded elastomeric film 31. The extruded film results from a polymeric composition, for example a styrenic block co-polymer, held in a die 30 and extruded therefrom onto a conveyer belt 33 and chilled by a chilled roll 32. The chilled extruded film 31 is then transported between conveyer belts 33 and 34 to a nip unit 38 where the two nonwoven facings having hot melt adhesive patterned thereon are applied, adhesive side facing the extruded film, one to either side of the chilled extruded film so as to produce a laminated web 39. The laminated web 39 is transported through a plurality of chilled rolls 40 and fed via a drive nip station 41 through a web heating station 42 to activation unit 44. An exemplary activation unit is more fully described in FIG. 4. The temperature of the laminated web is determined subsequent to exit from the web heating station 42 by pyrometer 43, and, optionally, adjustments are made to the heating station to achieve a desired temperature. The partially activated laminated web exiting activation unit 44 is fed by drive nip station 45 into a machine direction web conditioning heating zone 46 (for example, 3 strips) and the temperature of the laminated web exiting 46 is determined by pyrometer 47, and, optionally, adjustments are made to the machine direction web conditioning heating zone to achieve a desired temperature. A drive nip station 48 feeds the laminated web into a cross-direction pulling station 49 where the laminated web is stretched in the cross direction and relaxed back to original entry size before exiting the cross-direction pulling station 49. See FIGS. 5 and 6 for examples of a cross-direction pulling station. The resulting laminated web is fed onto a roll at re-winder station 51 after, optionally, passing through a drive station or a slides slitting station 50.

The invention claimed is:

1. An elastomeric laminated product made in accordance with the following process:
  laminating an elastomeric film between a first spunbond nonwoven layer and a second spunbond nonwoven layer so as to form a laminated web;
  transporting the laminated web through intermeshing rollers so as to strain portions of the laminated web to form activated regions in the laminated web;
  after the step of transporting, applying heat to non-activated regions of the activated laminated web and drawing the activated laminated web in the machine direction so as to elongate the non-activated regions; and
  transporting the activated laminated web to a first portion of a rotating wheel, the first portion of the wheel having a cross direction width that is smaller than a cross direction width at a second portion of the wheel, so that the laminated web follows rotation of the wheel and is stretched in the cross direction at the second portion of the wheel before separating from the wheel at the first portion in a relaxed state.

2. The elastomeric laminated product of claim 1, wherein the intermeshing rollers comprise at least two sets of a plurality of intermeshed protrusions so that at least two corresponding activated regions are formed in the laminated web.

3. The elastomeric laminated product of claim 1, wherein the step of laminating comprises transporting the elastomeric film and the first and second nonwoven layers through a lamination nip.

4. The elastomeric laminated product of claim 3, wherein the step of laminating comprises applying a patterned adhesive to the first and second nonwoven layers.

5. The elastomeric laminated product of claim 1, further comprising the step of applying heat to non-activated regions of the activated laminated web and drawing the activated laminated web in the machine direction.

6. The elastomeric laminated product of claim 1, further comprising the step of transporting the laminated web through a series of heaters prior to transporting the laminated web through intermeshing rollers.

7. The elastomeric laminated product of claim 1, wherein the rotating wheel comprises a first disc that rotates in a first plane and a second disc that rotates in a second plane, the first and second planes being angled relative to one another so that first portions of the first and second discs that collectively form the first portion of the wheel are closer to one another than second portions of the first and second discs that collectively form the second portion of the wheel.

8. The elastomeric laminated product of claim 1, wherein the elastomeric film comprises a styrenic block co-polymer.

9. The elastomeric laminated product of claim 8, wherein the styrenic block co-polymer comprises polystyrenic end blocks.

10. The elastomeric laminated product of claim 8, wherein the styrenic block co-polymer comprises hydrogenated mid-blocks of styrene-ethylene/butylene-styrene.

11. The elastomeric laminated product of claim 1, wherein the elastomeric film comprises a polypropylene, a copolyester, a nylon or a blend of polypropylenes.

* * * * *